United States Patent
Ozaki et al.

(10) Patent No.: US 12,107,271 B2
(45) Date of Patent: Oct. 1, 2024

(54) BINDER AQUEOUS SOLUTION FOR LITHIUM ION BATTERY, SLURRY FOR NEGATIVE ELECTRODE OF LITHIUM ION BATTERY, NEGATIVE ELECTRODE FOR LITHIUM ION BATTERY, AND LITHIUM ION BATTERY

(71) Applicant: ARAKAWA CHEMICAL INDUSTRIES, LTD., Osaka (JP)

(72) Inventors: Shinji Ozaki, Osaka (JP); Naoki Sasagawa, Osaka (JP); Hideki Goda, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 285 days.

(21) Appl. No.: 17/214,939

(22) Filed: Mar. 29, 2021

(65) Prior Publication Data

US 2021/0305574 A1 Sep. 30, 2021

(30) Foreign Application Priority Data

Mar. 30, 2020 (JP) ................................ 2020-059968

(51) Int. Cl.
| H01M 4/62 | (2006.01) |
| H01M 10/0525 | (2010.01) |
| H01M 4/02 | (2006.01) |

(52) U.S. Cl.
CPC ...... *H01M 4/622* (2013.01); *H01M 2004/027* (2013.01); *H01M 10/0525* (2013.01)

(58) Field of Classification Search
None
See application file for complete search history.

(56) References Cited

U.S. PATENT DOCUMENTS

2019/0020035 A1 * 1/2019 Hanasaki ............... C08K 5/544

FOREIGN PATENT DOCUMENTS

| CN | 108574101 | 9/2018 |
| CN | 108574102 | 9/2018 |
| JP | 2004185810 | 7/2004 |
| JP | 2005259697 | 9/2005 |
| JP | 2013089437 | 5/2013 |
| JP | 5390336 | 1/2014 |
| JP | 2015106488 | 6/2015 |
| JP | 2015118908 | 6/2015 |
| JP | 5903761 | 4/2016 |
| WO | 2015098507 | 7/2015 |

OTHER PUBLICATIONS

"Search Report of Europe Counterpart Application", issued on Aug. 9, 2021, pp. 1-7.
"Office Action of Europe Counterpart Application", issued on Nov. 9, 2023, p. 1-p. 5.

* cited by examiner

*Primary Examiner* — Carlos Barcena
(74) *Attorney, Agent, or Firm* — JCIPRNET

(57) ABSTRACT

Provided are a binder aqueous solution for a lithium ion battery, a negative electrode slurry for a lithium ion battery, a negative electrode for a lithium ion battery, and a lithium ion battery. The binder aqueous solution for a lithium ion battery has a pH of 5 or higher and contains: a water-soluble polymer (A) that is a polymer of a monomer group containing, with respect to 100 mol % of the monomer group, 15 mol % to 99.9 mol % of an unsaturated carboxylic acid or an inorganic salt thereof, and that has a glass transition temperature of 110° C. or lower; and a hydrolyzed partial condensate (B) of an amino group-containing trialkoxysilane.

6 Claims, No Drawings

BINDER AQUEOUS SOLUTION FOR LITHIUM ION BATTERY, SLURRY FOR NEGATIVE ELECTRODE OF LITHIUM ION BATTERY, NEGATIVE ELECTRODE FOR LITHIUM ION BATTERY, AND LITHIUM ION BATTERY

CROSS-REFERENCE TO RELATED APPLICATION

This application claims the priority benefit of Japanese Application Serial No. 2020-059968, filed on Mar. 30, 2020. The entirety of the above-mentioned patent application is hereby incorporated by reference herein and made a part of this specification.

BACKGROUND

Technical Field

The disclosure relates to a binder aqueous solution for a lithium ion battery, a negative electrode slurry for a lithium ion battery, a negative electrode for a lithium ion battery, and a lithium ion battery.

Related Art

Lithium ion batteries have a small size, light weight and high energy density, and further, are repeatedly chargeable and dischargeable, and are used in a wide range of applications. Hence, in recent years, improvements to battery members such as electrodes 20 have been studied with the aim of improving the performance of lithium ion batteries.

The positive electrode and negative electrode of a lithium ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

In recent years, in an electrode for a lithium ion battery, various electrode active materials have been proposed from the viewpoint of increasing battery capacity. However, depending on the electrode active material, the electrode for a lithium ion battery is likely to expand and contract with charging and discharging. Hence, the electrode for a lithium ion battery that is likely to expand and contract with charging and discharging undergoes a volume change from the initial stage of repetition of charging and discharging, and a lithium ion battery using the above electrode is likely to deteriorate in electrical characteristics such as cycle characteristics.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

PATENT DOCUMENTS

[Patent Document 1] Japanese Patent Laid-open No. 2015-118908
[Patent Document 2] Japanese Patent Laid-open No. 2015-106488
[Patent Document 3] WO 2015/098507

However, when crosslinking is performed using a crosslinker, flexibility of the binder resin is reduced, and as a result, electrode flexibility may be reduced. Also, in the related art, dispersion stability and storage stability of slurry were not sufficient. In addition, the binder has also been required to impart a good discharge capacity retention rate to the lithium ion battery.

As a result of earnest studies, the present inventors have found that the above problems can be solved.

SUMMARY

According to the disclosure, the following items are provided.

Item 1 is a binder aqueous solution for a lithium ion battery. The binder aqueous solution has a pH of 5 or higher and contains: a water-soluble polymer (A) that is a polymer of a monomer group containing, with respect to 100 mol % of the monomer group, 15 mol % to 99.9 mol % of an unsaturated carboxylic acid or an inorganic salt thereof, and that has a glass transition temperature of 110° C. or lower; and a hydrolyzed partial condensate (B) of an amino group-containing trialkoxysilane.

Item 2 is the binder aqueous solution for a lithium ion battery as described in the above Item. The binder aqueous solution for a lithium ion battery contains, with respect to 100 mol % of the monomer group, 15 mol % to 60 mol % of hydroxyalkyl(meth)acrylate having a hydroxyalkyl group having 2 to 4 carbon atoms.

Item 3 is the binder aqueous solution for a lithium ion battery as described in any one of the above Items, in which a molar ratio (amino group/carboxyl group) between amino group of the hydrolyzed partial condensate (B) of the amino group-containing trialkoxysilane to carboxyl group of the water-soluble polymer (A) is 0.05 or more.

Item 4 is a negative electrode slurry for a lithium ion battery. The slurry for the negative electrode contains: a water-soluble polymer (A) that is a polymer of a monomer group containing, with respect to 100 mol % of the monomer group, 15 mol % to 99.9 mol % of an unsaturated carboxylic acid or an inorganic salt thereof, and that has a glass transition temperature of 110° C. or lower; a hydrolyzed partial condensate (B) of an amino group-containing trialkoxysilane; a negative electrode active material (C); and a conductive carbon aid (D), having a zeta potential of 0 mV or higher at pH 5 to 7.

Item 5 is a negative electrode for a lithium ion battery. The negative electrode for a lithium ion battery is obtained by applying the negative electrode slurry for a lithium ion battery as described in the above Item to a current collector, and drying and curing the same.

Item 6 is a lithium ion battery. The lithium ion battery includes the negative electrode for a lithium ion battery as described in the above Item.

In the disclosure, one or more of the features described above may be provided in combination in addition to the specified combinations.

DESCRIPTION OF THE EMBODIMENTS

One embodiment of the disclosure provides a binder aqueous solution for a lithium ion battery, the binder aqueous solution being capable of imparting a good discharge capacity retention rate to a lithium ion battery, good flexibility to a negative electrode, and good dispersion stability and storage stability to a slurry.

Another embodiment of the disclosure provides a negative electrode slurry for a lithium ion battery, the slurry for the negative electrode being capable of imparting a good discharge capacity retention rate to a lithium ion battery and good flexibility to a negative electrode, and having good dispersion stability and storage stability.

The binder aqueous solution for a lithium ion battery according to the present embodiment is capable of imparting excellent dispersion stability and storage stability to a negative electrode slurry for a lithium ion battery. In addition, the negative electrode slurry for a lithium ion battery according to the present embodiment has excellent dispersion stability and storage stability. Furthermore, the negative electrode according to the present embodiment has excellent flexibility. The lithium ion battery according to the present embodiment has an excellent discharge capacity retention rate.

Throughout the disclosure, ranges of numerical values such as physical property values and content may be suitably set (for example, selected from the upper and lower limit values described in each item below). Specifically, regarding a numerical value $\alpha$, when the upper limit and lower limit of the numerical value $\alpha$ are, for example, A4, A3, A2, and A1 (in which A4>A3>A2>A1), the numerical value $\alpha$ is in a range of, for example, A4 or less, A3 or less, A2 or less, A1 or more, A2 or more, A3 or more, A1 to A2, A1 to A3, A1 to A4, A2 to A3, A2 to A4, and A3 to A4.

[Binder Aqueous Solution for Lithium Ion Battery: Also Referred to as "Aqueous Solution"]

The disclosure provides a binder aqueous solution for a lithium ion battery, the binder aqueous solution having a pH of 5 or higher and containing: a water-soluble polymer (A) that is a polymer of a monomer group containing, with respect to 100 mol % of the monomer group, 15 mol % to 99.9 mol % of an unsaturated carboxylic acid or an inorganic salt thereof, and that has a glass transition temperature of 110° C. or lower; and a hydrolyzed partial condensate (B) of an amino group-containing trialkoxysilane.

<Water-Soluble Polymer: Also Referred to as Component (A)>

The component (A) may be used singly or in combination of two or more.

In the disclosure, "water-soluble" means having an insoluble content of less than 0.5% by mass (less than 2.5 mg) when 0.5 g of a compound thereof is dissolved in 100 g of water at 25° C.

In the case where the component (A) is not water-soluble, since it does not dissolve in water, no aqueous solution is formed at all. As a result, the component (A) does not contribute to dispersion of a slurry. In addition, viscosity required for application to a current collector cannot be imparted to the slurry.

When 0.5 g of the component (A) is dissolved in 100 g of water, the insoluble content of the component (A) is, for example, less than 0.5% by mass, less than 0.4% by mass, less than 0.3% by mass, less than 0.2% by mass, less than 0.1% by mass, or 0% by mass.

In the disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

(Unsaturated Carboxylic Acid or Inorganic Salt Thereof)

An unsaturated carboxylic acid or an inorganic salt thereof may be used singly or in combination of two or more.

Examples of the unsaturated carboxylic acid include (meth)acrylic acid, crotonic acid, maleic acid, fumaric acid, and itaconic acid. Among them, when (meth)acrylic acid especially acrylic acid is used, a binder can be provided which has high interaction with an electrode active material or a conductive carbon aid and has good slurry dispersibility.

Examples of the inorganic salt include alkali metal salt and alkaline earth metal salt. In the disclosure, an inorganic salt of an organic substance (for example, an inorganic salt of one or more unsaturated acids selected from the group consisting of unsaturated carboxylic acids and unsaturated sulfonic acids, or an inorganic salt of the component (A) or the like) refers to a salt whose cationic portion is a metal cation.

Examples of the alkali metal include lithium, sodium, and potassium.

Examples of the alkaline earth metal include magnesium and calcium.

The upper limit and lower limit of the content of the unsaturated carboxylic acid or an inorganic salt thereof with respect to 100 mol % of the monomer group are, for example, 99.9 mol %, 99 mol %, 95 mol %, 90 mol %, 89.95 mol %, 85 mol %, 80 mol %, 75 mol %, 70 mol %, 65 mol %, 60 mol %, 59.95 mol %, 55 mol %, 50 mol %, 45 mol %, 40 mol %, 36.7 mol %, 35 mol %, 30 mol %, 25 mol %, 20 mol %, and 15 mol %. In one embodiment, the above content is preferably 15 mol % to 99.9 mol %.

The upper limit and lower limit of the content of the unsaturated carboxylic acid or an inorganic salt thereof with respect to 100% by mass of the monomer group are, for example, 99.9% by mass, 99% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 36.7% by mass, 35% by mass, 30% by mass, 25% by mass, 20% by mass, 15% by mass, 10% by mass, and 5% by mass. In one embodiment, the above content is preferably 5% by mass to 99.9% by mass.

(Hydroxyalkyl(meth)acrylate Having Hydroxyalkyl Group Having 2 to 4 Carbon Atoms)

In one embodiment, the above monomer group may contain a hydroxyalkyl(meth)acrylate having a hydroxyalkyl group having 2 to 4 carbon atoms. The hydroxyalkyl (meth)acrylate having a hydroxyalkyl group having 2 to 4 carbon atoms may be used singly or in combination of two or more.

In the disclosure, "hydroxyalkyl group having 2 to 4 carbon atoms" refers to a group in which one of hydrogen atoms constituting an alkyl group having 2 to 4 carbon atoms is substituted with a hydroxy group.

Examples of the hydroxyalkyl(meth)acrylate having a hydroxyalkyl group having 2 to 4 carbon atoms include 1-hydroxyethyl(meth)acrylate, 2-hydroxyethyl(meth)acrylate, 1-hydroxypropyl(meth)acrylate, 2-hydroxypropyl (meth)acrylate, 3-hydroxypropyl(meth)acrylate, 2-hydroxy-1-methylethyl(meth)acrylate, 1-hydroxy-2-methylethyl (meth)acrylate, 1-hydroxybutyl(meth)acrylate, 2-hydroxybutyl(meth)acrylate, 3-hydroxybutyl(meth)acrylate, 4-hydroxybutyl(meth)acrylate, 1-hydroxy-1-methylpropyl(meth)acrylate, 2-hydroxy-1-methyl-propyl(meth) acrylate, 3-hydroxy-1-methyl-propyl(meth)acrylate, 1-ethyl-2-hydroxyethyl(meth)acrylate, 1-hydroxy-2-methyl-propyl(meth)acrylate, 2-hydroxy-2-methyl-propyl (meth)acrylate, 3-hydroxy-2-methyl-propyl(meth)acrylate, and 1,1-dimethyl-2-hydroxyethyl(meth)acrylate.

Among them, when 2-hydroxyethyl(meth)acrylate especially 2-hydroxyethyl acrylate is used, a binder can be provided which not only reduces water absorption while maintaining water solubility, but also reduces irreversible capacity, and is capable of imparting good flexibility to electrode.

The upper limit and lower limit of the content of the hydroxyalkyl(meth)acrylate having a hydroxyalkyl group having 2 to 4 carbon atoms with respect to 100 mol % of the monomer group are, for example, 60 mol %, 56 mol %, 55 mol %, 50 mol %, 45 mol %, 40 mol %, 35 mol %, 30 mol %, 28.5 mol %, 25 mol %, 20 mol %, 15 mol %, 10 mol %, 5 mol %, and 0 mol %. In one embodiment, the above content is preferably 0 mol % to 60 mol %, more preferably 15 mol % to 60 mol %.

The upper limit and lower limit of the content of the hydroxyalkyl(meth)acrylate having a hydroxyalkyl group having 2 to 4 carbon atoms with respect to 100% by mass of the monomer group are, for example, 80% by mass, 75% by mass, 70% by mass, 65% by mass, 60% by mass, 55% by mass, 50% by mass, 45% by mass, 40% by mass, 36.7% by mass, 35% by mass, 30% by mass, 25% by mass, 20% by mass, 15% by mass, 10% by mass, 5% by mass, and 0% by mass. In one embodiment, the above content is preferably 0% by mass to 80% by mass.

((Meth)acrylamide Group-Containing Compound)

In one embodiment, the above monomer group may contain a (meth)acrylamide group-containing compound. In the disclosure, "(meth)acrylamide group-containing compound" means a compound having a (meth)acrylamide group. The (meth)acrylamide group-containing compound may be used singly or in combination of two or more.

In one embodiment, the (meth)acrylamide group-containing compound is expressed by the following structural formula:

[Chemical formula 1]

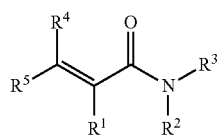

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group (—$NR^aR^b$ (in which $R^a$ and $R^b$ are each independently a hydrogen atom or a substituted or unsubstituted alkyl group)), or an acetyl group. Examples of a substituent of the substituted alkyl group include hydroxy group, amino group, and acetyl group. In addition, examples of the group in which $R^2$ and $R^3$ form a ring structure together include morpholyl group.)

Examples of the alkyl group include linear alkyl group, branched alkyl group, and cycloalkyl group.

The linear alkyl group is expressed by a general formula of —$C_nH_{2n+1}$ (in which n is an integer of 1 or more). Examples of the linear alkyl group include methyl group, ethyl group, propyl group, n-butyl group, n-pentyl group, n-hexyl group, n-heptyl group, n-octyl group, n-nonyl group, and n-decamethyl group.

The branched alkyl group is a group in which at least one hydrogen of a linear alkyl group is substituted with an alkyl group. Examples of the branched alkyl group include i-propyl group, i-butyl group, s-butyl group, t-butyl group, diethylpentyl group, trimethylbutyl group, trimethylpentyl group, and trimethylhexyl group.

Examples of the cycloalkyl group include monocyclic cycloalkyl group, crosslinked cyclic cycloalkyl group, and condensed cyclic cycloalkyl group.

In the disclosure, "monocyclic" means having a cyclic structure formed by covalent bonding of carbons and without crosslinking structure therein. "Condensed cyclic" means having a cyclic structure in which two or more single rings share two atoms (that is, only one side of each ring is shared (condensed) with each other). "Crosslinked cyclic" means having a cyclic structure in which two or more single rings share three or more atoms.

Examples of the monocyclic cycloalkyl group include cyclopentyl group, cyclohexyl group, cycloheptyl group, cyclodecyl group, and 3,5,5-trimethylcyclohexyl group.

Examples of the crosslinked cyclic cycloalkyl group include tricyclodecyl group, adamantyl group, and norbornyl group.

Examples of the condensed cyclic cycloalkyl group include bicyclodecyl group.

Examples of the above (meth)acrylamide group-containing compound include (meth)acrylamide, N-isopropyl(meth)acrylamide, N,N-dimethyl(meth)acrylamide, N,N-diethyl(meth)acrylamide, N,N-dimethylaminopropyl(meth)acrylamide, N-methylol(meth)acrylamide, diacetone(meth)acrylamide, maleic acid amide, (meth)acryloylmorpholine, hydroxyethyl(meth)acrylamide, and a salt thereof. Examples of the above salt include dimethylaminopropyl(meth)acrylamide methyl chloride quaternary salt, and dimethylaminoethyl (meth)acrylate benzyl chloride quaternary salt. Among them, when (meth)acrylamide especially acrylamide is used, a binder can be prepared which not only reduces water absorption while maintaining water solubility, but also reduces irreversible capacity, has high interaction with an electrode active material, and improves slurry dispersibility or a binding property between electrode active materials inside an electrode.

The upper limit and lower limit of the content of the (meth)acrylamide group-containing compound with respect to 100 mol % of the monomer group are, for example, 90 mol %, 89.95 mol %, 85 mol %, 80 mol %, 75 mol %, 70 mol %, 69.8 mol %, 65 mol %, 60 mol %, 59.95 mol %, 55 mol %, 50 mol %, 45 mol %, 40 mol %, 35 mol %, 34.6 mol %, 30 mol %, 25 mol %, 20 mol %, 15 mol %, 10 mol %, 5 mol %, 4 mol %, 3.8 mol %, 3 mol %, 2 mol %, 1 mol %, and 0 mol %. In one embodiment, the above content is preferably 0 mol % to 90 mol %.

The upper limit and lower limit of the content of the (meth)acrylamide group-containing compound with respect to 100% by mass of the monomer group are, for example, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, and 0% by mass. In one embodiment, the above content is preferably 0% by mass to 90% by mass.

(Unsaturated Sulfonic Acid)

In one embodiment, the above monomer group may contain an unsaturated sulfonic acid. The unsaturated sulfonic acid may be used singly or in combination of two or more.

Examples of the unsaturated sulfonic acid include: $\alpha,\beta$-ethylenically unsaturated sulfonic acid, such as vinylsulfonic acid, styrenesulfonic acid, and (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, and bis-(3-sulfopropyl)itaconic ester.

The upper limit and lower limit of the content of the unsaturated sulfonic acid with respect to 100 mol % of the monomer group are, for example, 20 mol %, 17 mol %, 15 mol %, 13 mol %, 10 mol %, 9 mol %, 7 mol %, 5 mol %, 4 mol %, 2 mol %, 1 mol %, 0.9 mol %, 0.7 mol %, 0.5 mol %, 0.3 mol %, 0.2 mol %, 0.1 mol %, 0.09 mol %, 0.07 mol %, 0.05 mol %, 0.03 mol %, 0.01 mol %, and 0 mol %. In one embodiment, the above content is preferably 0 mol % to 20 mol %.

The upper limit and lower limit of the content of the unsaturated sulfonic acid with respect to 100% by mass of the monomer group are, for example, 30% by mass, 25% by mass, 20% by mass, 17% by mass, 15% by mass, 13% by mass, 10% by mass, 9% by mass, 7% by mass, 5% by mass, 4% by mass, 2% by mass, 1% by mass, 0.9% by mass, 0.7% by mass, 0.5% by mass, 0.3% by mass, 0.2% by mass, 0.1% by mass, 0.09% by mass, 0.07% by mass, 0.05% by mass, 0.03% by mass, 0.01% by mass, and 0% by mass. In one embodiment, the above content is preferably 0% by mass to 30% by mass.

(Unsaturated Phosphoric Acid)

In one embodiment, the above monomer group may contain an unsaturated phosphoric acid. The unsaturated phosphoric acid may be used singly or in combination of two or more.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, and 3-(meth)acryloxy-2-hydroxypropanephosphoric acid.

The upper limit and lower limit of the content of the unsaturated phosphoric acid with respect to 100 mol % of the monomer group are, for example, 10 mol %, 9 mol %, 7 mol %, 5 mol %, 4 mol %, 2 mol %, 1 mol %, 0.9 mol %, 0.7 mol %, 0.5 mol %, 0.3 mol %, 0.2 mol %, 0.1 mol %, 0.09 mol %, 0.07 mol %, 0.05 mol %, 0.03 mol %, 0.01 mol %, and 0 mol %. In one embodiment, the above content is preferably 0 mol % to 10 mol %.

The upper limit and lower limit of the content of the unsaturated phosphoric acid with respect to 100% by mass of the monomer group are, for example, 20% by mass, 17% by mass, 15% by mass, 13% by mass, 10% by mass, 9% by mass, 7% by mass, 5% by mass, 4% by mass, 2% by mass, 1% by mass, 0.9% by mass, 0.7% by mass, 0.5% by mass, 0.3% by mass, 0.2% by mass, 0.1% by mass, 0.09% by mass, 0.07% by mass, 0.05% by mass, 0.03% by mass, 0.01% by mass, and 0% by mass. In one embodiment, the above content is preferably 0% by mass to 20% by mass.

($\alpha,\beta$-Unsaturated Nitrile)

In one embodiment, the above monomer group may contain an $\alpha,\beta$-unsaturated nitrile. The $\alpha,\beta$-unsaturated nitrile may be used singly or in combination of two or more.

The $\alpha,\beta$-unsaturated nitrile can be suitably used for the purpose of imparting flexibility to an electrode.

Examples of the $\alpha,\beta$-unsaturated nitrile include (meth)acrylonitrile, $\alpha$-chloro(meth)acrylonitrile, $\alpha$-ethyl(meth)acrylonitrile, and vinylidene cyanide. Among them, (meth)acrylonitrile is preferable, and acrylonitrile is particularly preferable.

The upper limit and lower limit of the content of the $\alpha,\beta$-unsaturated nitrile with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %.

The upper limit and lower limit of the content of the $\alpha,\beta$-unsaturated nitrile with respect to 100% by mass of the monomer group are exemplified by 30% by mass, 25% by mass, 20% by mass, 15% by mass, 10% by mass, 5% by mass, and 0% by mass. In one embodiment, the above content is preferably 0% by mass to 30% by mass.

<Monomers Corresponding to None of the Above: Also Referred to as Other Components>

In the above monomer group, monomers (other components) that correspond to none of the unsaturated carboxylic acid or an inorganic salt thereof, the hydroxyalkyl(meth)acrylate having a hydroxyalkyl group having 2 to 4 carbon atoms, the (meth)acrylamide group-containing compound, the unsaturated sulfonic acid, the unsaturated phosphoric acid and the $\alpha,\beta$-unsaturated nitrile may be used as long as the desired effects of the disclosure are not impaired. As the other components, various known ones may be used singly or in combination of two or more.

Examples of the other components include a hydroxyl group-free unsaturated carboxylic ester, a conjugated diene, and an aromatic vinyl compound.

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, and a hydroxyl group-free alkoxyalkyl (meth)acrylate.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, and decyl (meth)acrylate.

Examples of the hydroxyl group-free branched (meth)acrylic ester include i-propyl (meth)acrylate, i-butyl (meth)acrylate, i-amyl (meth)acrylate, and 2-ethylhexyl (meth)acrylate.

Examples of the hydroxyl group-free alicyclic (meth)acrylic ester include cyclohexyl (meth)acrylate.

Examples of the hydroxyl group-free alkoxyalkyl (meth)acrylate include methoxymethyl (meth)acrylate, 2-methoxyethyl (meth)acrylate, 1-methoxyethyl (meth)acrylate, 3-methoxypropyl (meth)acrylate, 2-methoxypropyl (meth)acrylate, 1-methoxypropyl (meth)acrylate, 4-methoxybutyl (meth)acrylate, 3-methoxybutyl (meth)acrylate, 2-methoxybutyl (meth)acrylate, 1-methoxybutyl (meth)acrylate, ethoxymethyl (meth)acrylate, 2-ethoxyethyl (meth)acrylate, 1-ethoxyethyl (meth)acrylate, 3-ethoxypropyl (meth)acrylate, 2-ethoxypropyl (meth)acrylate, 1-ethoxypropyl (meth)acrylate, propoxymethyl (meth)acrylate, 2-propoxyethyl (meth)acrylate, 1-propoxyethyl (meth)acrylate, and butoxymethyl (meth)acrylate.

The hydroxyl group-free unsaturated carboxylic ester can be suitably used for the purpose of imparting flexibility to an electrode. From the above viewpoint, the content of the hydroxyl group-free unsaturated carboxylic ester with respect to 100 mol % of the above monomer group is preferably less than 30 mol % (for example, less than 25 mol %, less than 20 mol %, less than 19 mol %, less than 15 mol %, less than 10 mol %, less than 5 mol %, less than 1 mol %, or 0 mol %).

In addition, the content of the hydroxyl group-free unsaturated carboxylic ester with respect to 100% by mass of the above monomer group is preferably 30% by mass or less (for example, less than 25% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, and a substituted and side chain conjugated hexadiene.

From the viewpoint of cycle characteristics of the lithium ion battery, the content of the conjugated diene with respect to 100 mol % of the above monomer group is preferably less than 10 mol %, more preferably 0 mol %.

The upper limit and lower limit of the content of the conjugated diene with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

In addition, examples of the aromatic vinyl compound include styrene, α-methylstyrene, p-methylstyrene, vinyltoluene, chlorostyrene, and divinylbenzene.

From the viewpoint of cycle characteristics of the lithium ion battery, the content of the aromatic vinyl compound with respect to 100 mol % of the above monomer group is preferably less than 10 mol %, more preferably 0 mol %.

The upper limit and lower limit of the content of the aromatic vinyl compound with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

A ratio of the other components than the hydroxyl group-free unsaturated carboxylic ester, the conjugated diene and the aromatic vinyl compound mentioned above in the above monomer group is, for example, less than 10 mol %, less than 5 mol %, less than 2 mol %, less than 1 mol %, less than 0.9 mol %, less than 0.5 mol %, less than 0.4 mol %, less than 0.3 mol %, less than 0.1 mol %, less than 0.05 mol %, less than 0.01 mol %, or 0 mol %, with respect to 100 mol % of the above monomer group. In addition, with respect to 100% by mass of the above monomer group, the ratio of the other components is, for example, less than 10% by mass, less than 9% by mass, less than 7% by mass, less than 5% by mass, less than 4% by mass, less than 2% by mass, less than 1% by mass, less than 0.9% by mass, less than 0.5% by mass, less than 0.4% by mass, less than 0.3% by mass, less than 0.1% by mass, less than 0.05% by mass, less than 0.010% by mass, or 0% by mass.

<Method for Preparing Component (A)>

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate; a redox polymerization initiator in which the above persulfate and a reductant such as sodium bisulfite are combined; and an azo initiator, such as 2,2'-azobis-2-amidinopropane dihydrochloride. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, and lithium hydroxide. In this case, the pH is preferably 2 to 11. For the same purpose, it is also possible to use ethylene diamine tetraacetic acid (EDTA), which is a metal ion sealant, or a salt thereof, or the like.

<Physical Properties of Component (A)>

From the viewpoint of suppressing the occurrence of cracks or curls of an electrode, a glass transition temperature of the component (A) is 110° C. or lower.

The upper limit and lower limit of the glass transition temperature of the component (A) are, for example, 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., and 10° C. In one embodiment, the glass transition temperature of the component (A) is preferably 10° C. to 110° C. considering the discharge capacity retention rate.

The glass transition temperature of the component (A) is calculated as follows. Moreover, the glass transition temperature may be adjusted by a combination of monomers.

(1) When the Constituent Monomers of the Component (A) are Known

The glass transition temperature of the component (A) can be calculated from glass transition temperatures (Tg) (absolute temperature: K) of homopolymers of the monomers and mass fractions thereof based on the Fox equation shown below.

$$1/Tg = (W_1/Tg_1) + (W_2/Tg_2) + (W_3/Tg_3) + \ldots + (W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of "Handbook of Chemistry: Pure Chemistry II" (Revised 5th Edition) edited by the Chemical Society of Japan.

(2) When the Constituent Monomers of the Component (A) are Unknown

The glass transition temperature of the component (A) can be measured by a differential scanning calorimeter (DSC) under the condition that the temperature is raised from −100° C. to 300° C. (at a temperature rising rate of 10° C./min).

A weight average molecular weight (Mw) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, and 300,000. In one embodiment, from the viewpoint of dispersion stability of the above slurry, 300,000 to 6,000,000 are preferable, and 350,000 to 6,000,000 are more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, 200,000, 100,000, 50,000, and 10,000. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, and 1.1. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 45,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, 900 mPa·s, 700 mPa·s, 500 mPa·s, 300 mPa·s, 200 mPa·s, and 100 mPa·s. In one embodiment, the above range of the B-type viscosity is preferably 100 mPa·s to 100,000 mPa·s.

The B-type viscosity is measured by a B-type viscometer such as "B-type Viscometer Model BM" (product name) made by Toki Sangyo Co., Ltd.

In one embodiment, a neutralization ratio of the carboxyl group of the component (A) is preferably 50% or more (for example, 55% or more, 60% or more, 65% or more, 70% or more, 75% or more, 80% or more, 85% or more, 90% or more, 95% or more, or 100%). In the disclosure, the neutralization ratio of a carboxyl group means a ratio at which the carboxyl group (—COOH) becomes an acid group (—COO—). The above neutralization ratio can be adjusted with an inorganic salt such as an alkali metal salt or an alkaline earth metal salt.

The upper limit and lower limit of the content of the component (A) with respect to 100% by mass of the binder aqueous solution for a lithium ion battery are, for example, 20% by mass, 19% by mass, 15% by mass, 14% by mass, 12% by mass, 10% by mass, 9% by mass, 7% by mass, 6% by mass, 5% by mass, 4% by mass, 3% by mass, 2% by mass, and 1% by mass. In one embodiment, the above content is preferably 1% by mass to 20% by mass.

<Hydrolyzed Partial Condensate (B) of Amino Group-Containing Trialkoxysilane: Also Referred to as Component (B)>

The component (B) may be used singly or in combination of two or more.

In one embodiment, the amino group-containing trialkoxysilane is a compound expressed by the following general formula:

[Chemical formula 2]

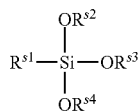

(In the formula, $R^{s1}$ is a group having an amino group (—$NR^{am1}R^{am2}$: $R^{am1}$ to $R^{am2}$ are each independently a hydrogen atom, an alkyl group, an aryl group or the like); $R^{s2}$ to $R^{s4}$ are each independently an alkyl group.)

Examples of the group having an amino group (—$NR^{am1}R^{am2}$: $R^{am1}$ to $R^{am2}$ are each independently a hydrogen atom, an alkyl group, an aryl group or the like) include an amino group-substituted alkyl group. The amino group-substituted alkyl group is a group in which one hydrogen atom constituting an alkyl group is substituted with an amino group.

Examples of the amino group-containing trialkoxysilane include 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane.

In the disclosure, "hydrolyzed partial condensate of trialkoxysilane" means a hydrolyzed condensate in which an alkoxy group is present. A residual ratio of a hydrolyzable group is not particularly limited. In the disclosure, a hydrolyzed partial condensate of a trialkoxysilane is used instead of a hydrolyzed complete condensate of a trialkoxysilane from the viewpoint that no gelation has occurred. The hydrolyzed partial condensate of the amino group-containing trialkoxysilane means a hydrolyzed partial condensate of trialkoxysilane containing an amino group.

The upper limit and lower limit of a degree of condensation of the hydrolyzed partial condensate of the amino group-containing trialkoxysilane are, for example, 1,000, 900, 800, 700, 600, 500, 400, 300, 200, 100, 90, 80, 70, 60, 50, 40, 30, 20, 19, 17, 15, 14, 13, 12, 11, 10, 9, 5, 3, 2, 1.7, 1.5, 1.4, 1.2, 1.1, and 1.01. In one embodiment, the degree of condensation of the hydrolyzed partial condensate of the amino group-containing trialkoxysilane is preferably 1.01 to 1,000, more preferably 1.01 to 100.

The upper limit and lower limit of a weight average molecular weight of the hydrolyzed partial condensate of the amino group-containing trialkoxysilane are, for example, 190,000, 170,000, 150,000, 130,000, 100,000, 90,000, 70,000, 50,000, 30,000, 20,000, 10,000, 9,000, 7,500, 5,000, 2,500, 1,000, 900, 750, 500, 250, 200, 175, 160, 150, 125, 110, and 100. In one embodiment, the above weight average molecular weight is preferably 100 to 190,000.

The hydrolyzed partial condensate of the amino group-containing trialkoxysilane may be obtained by hydrolyzing 100 parts by mass of the amino group-containing trialkoxysilane in the presence of 0 part to 5 parts by mass of an acid or base catalyst (preferably an acid catalyst), and partially condensing the same. Specifically, it is preferable to carry out the reaction for 0.5 hour to 5.0 hours at a reaction temperature 30° C. to 60° C. while stirring a reaction solution containing the above components.

Examples of the acid catalyst include nitric acid, hydrochloric acid, sulfurous acid, phosphoric acid, formic acid, and acetic acid.

Examples of the base catalyst include sodium hydroxide, lithium hydroxide, potassium hydroxide, calcium hydroxide, and an amine compound.

The upper limit and lower limit of the content of the component (B) with respect to 100% by mass of the binder aqueous solution for a lithium ion battery are, for example, 10% by mass, 9% by mass, 8% by mass, 7% by mass, 6% by mass, 5% by mass, 4.5% by mass, 4% by mass, 3.5% by mass, 3% by mass, 2.5% by mass, 2% by mass, 1.5% by mass, 1% by mass, 0.9% by mass, 0.5% by mass, 0.1% by mass, 0.09% by mass, 0.05% by mass, 0.03% by mass, and 0.01% by mass. In one embodiment, the above content is preferably 0.01% by mass to 10% by mass.

The upper limit and lower limit of a mass ratio [(A)/(B)] between the component (A) and the component (B) contained in the binder aqueous solution for a lithium ion battery are, for example, 2,000, 1,750, 1,500, 1,250, 1,000, 750, 500, 250, 100, 75, 50, 25, 10, 5, 2, and 1. In one embodiment, the above mass ratio [(A)/(B)] is preferably 1 to 2,000.

The upper limit and lower limit of a molar ratio (amino group/carboxyl group) between the amino group of the above hydrolyzed partial condensate (B) of the amino group-containing trialkoxysilane and the carboxyl group of the above water-soluble polymer (A) are, for example, 500, 475, 450, 425, 400, 375, 350, 325, 300, 275, 250, 225, 200, 175, 150, 125, 100, 75, 50, 25, 20, 15, 10, 9, 7, 5, 2, 1, 0.9, 0.5, 0.2, 0.1, and 0.05. In one embodiment, the above molar ratio is preferably 0.05 or more, more preferably 0.05 to 500.

<Water>

Examples of the water include ultrapure water, pure water, distilled water, ion-exchanged water, and tap water.

The upper limit and lower limit of the content of the water with respect to 100% by mass of the binder aqueous solution for a lithium ion battery are, for example, 99.9% by mass, 99% by mass, 95% by mass, 90% by mass, 85% by mass, and 80% by mass. In one embodiment, the above content is preferably 80% by mass to 99.9% by mass.

The upper limit and lower limit of a mass ratio [component (A)/water] between the component (A) and the water contained in the binder aqueous solution for a lithium ion battery are, for example, 0.25, 0.24, 0.22, 0.20, 0.18, 0.15, 0.12, 0.10, 0.09, 0.07, and 0.05. In one embodiment, the above mass ratio is preferably 0.05 to 0.25.

The upper limit and lower limit of a mass ratio [component (B)/water] between the component (B) and the water contained in the binder aqueous solution for a lithium ion battery are, for example, 0.06, 0.05, 0.02, 0.01, 0.009, 0.007, 0.005, 0.003, 0.001, 0.0009, 0.0007, 0.0005, 0.0003 and 0.0001. In one embodiment, the above mass ratio is preferably 0.0001 to 0.06.

<Dispersion (Emulsion)>

In one embodiment, the above binder aqueous solution for a lithium ion battery contains a dispersion (emulsion).

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), and an ethylene tetrafluoroethylene (ETFE) copolymer.

The upper limit and lower limit of the content of the dispersion (emulsion) with respect to 100% by mass of the component (A) are, for example, 100% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, the above content is preferably 0% by mass to 100% by mass from the viewpoints of electrode flexibility and discharge capacity retention rate.

<Thickener>

In one embodiment, the above binder aqueous solution for a lithium ion battery contains a thickener.

Examples of the thickener include: a cellulosic polymer, such as carboxymethyl cellulose, methyl cellulose, and hydroxypropyl cellulose, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, polyvinylpyrrolidone, modified polyacrylic acid, oxidized starch, phosphoric acid starch, casein, various modified starches, and an acrylonitrile-butadiene copolymer hydride.

The upper limit and lower limit of the content of the thickener with respect to 100% by mass of the component (A) are, for example, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, the above content is preferably 0% by mass to 50% by mass.

<Additive>

The binder aqueous solution for a lithium ion battery may contain, as an additive, a component that does not correspond to any of the component (A), the component (B), water, the dispersion (emulsion) and the thickener.

Examples of the additive include a dispersant, a leveling agent, and an antioxidant.

Examples of the dispersant include an anionic dispersant, a cationic dispersant, a nonionic dispersant, and a polymer dispersant.

Examples of the leveling agent include a surfactant, such as an alkyl-based surfactant, a silicon-based surfactant, a fluorine-based surfactant, and a metal-based surfactant. By using the surfactant, cissing that occurs during coating may be prevented and smoothness of the above slurry layer (coating layer) may be improved.

Examples of the antioxidant include a phenol compound, a hydroquinone compound, an organophosphorus compound, a sulfur compound, a phenylenediamine compound, and a polymer type phenol compound. The polymer type phenol compound is a polymer having a phenol structure in a molecule. A weight average molecular weight of the polymer type phenol compound is preferably 200 to 1,000, more preferably 600 to 700.

The content of the additive is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, or 0% by mass, with respect to 100% by mass of the component (A) or the component (B).

In addition, the content of the additive with respect to 100% by mass of the above aqueous solution is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, or 0% by mass.

If the pH is 5 or higher, the conductive carbon aid has good dispersibility, and as a result, an excellent discharge capacity retention rate is exhibited. Hence, the pH of the binder aqueous solution for a lithium ion battery is set to 5 or higher.

The upper limit and lower limit of the pH of the binder aqueous solution for a lithium ion battery are, for example, 9, 8.9, 8.5, 8, 7.9, 7.7, 7.5, 7.3, 7.1, 7, 6.9, 6.7, 6.5, 6.3, 6, 5.9, 5.6, 5.5, 5.4, 5.2, 5.1, and 5.

The pH may be measured at 25° C. using a glass electrode pH meter (for example, "Handy pH Meter D-52" (product name) made by Horiba, Ltd.).

The binder aqueous solution for a lithium ion battery may be used as a binder aqueous solution for a lithium ion battery electrode, a binder aqueous solution for a lithium ion battery negative electrode, or a conductive carbon aid dispersant for a lithium ion battery.

[Negative Electrode Slurry for Lithium Ion Battery: Also Referred to as Slurry]

The disclosure provides a negative electrode slurry for a lithium ion battery, the slurry for the negative electrode containing: a water-soluble polymer (A) that is a polymer of a monomer group containing, with respect to 100 mol % of the monomer group, 15 mol % to 99.9 mol % of an unsaturated carboxylic acid or an inorganic salt thereof, and that has a glass transition temperature of 110° C. or lower; a hydrolyzed partial condensate (B) of an amino group-containing trialkoxysilane; a negative electrode active material (C); and a conductive carbon aid (D), having a zeta potential of 0 mV or higher at pH 5 to 7.

The above water-soluble polymer (A) and the above hydrolyzed partial condensate (B) of the amino group-containing trialkoxysilane are exemplified by those described above.

In the disclosure, "slurry" means a suspension of liquid and solid particles.

The upper limit and lower limit of the content of the component (A) with respect to 100% by mass of the above slurry are, for example, 10% by mass, 9% by mass, 8% by mass, 7% by mass, 6% by mass, 5% by mass, 4% by mass, 3% by mass, 2% by mass, 1% by mass, 0.9% by mass, 0.7% by mass, 0.5% by mass, 0.3% by mass, and 0.1% by mass. In one embodiment, the above content is preferably 10% by mass to 10% by mass with respect to 100% by mass of the above slurry.

The upper limit and lower limit of the content of the component (B) with respect to 100% by mass of the above slurry are, for example, 5% by mass, 4% by mass, 3% by mass, 2% by mass, 1% by mass, 0.9% by mass, 0.7% by mass, 0.5% by mass, 0.3% by mass, 0.1% by mass, 0.09% by mass, 0.07% by mass, 0.05% by mass, 0.03% by mass, and 0.01% by mass. In one embodiment, the above content is preferably 0.01% by mass to 5% by mass.

The upper limit and lower limit of the content of the water with respect to 100% by mass of the above slurry are, for example, 70% by mass, 65% by mass, 60% by mass, 55% by mass, 50% by mass, 45% by mass, 40% by mass, 35% by mass, and 30% by mass. In one embodiment, the above content is preferably 30% by mass to 70% by mass.

<Negative Electrode Active Material (C): Also Referred to as Component (C)>

A negative electrode active material may be used singly or in combination of two or more.

The negative electrode active material is not particularly limited as long as being capable of reversibly occluding and releasing lithium, and an appropriate material may be suitably selected depending on the type of the target lithium ion battery. The negative electrode active material may be used singly or in combination of two or more. Examples of the negative electrode active material include a carbon material, as well as a material alloyable with lithium, such as a silicon material, a lithium atom-containing oxide, a lead compound, a tin compound, an arsenic compound, an antimony compound, and an aluminum compound.

Examples of the above carbon material include graphite (for example, natural graphite and artificial graphite) which is highly crystalline carbon, low crystalline carbon (such as soft carbon and hard carbon), carbon black (such as Ketjen black, acetylene black, channel black, lamp black, oil furnace black, and thermal black), a fullerene, a carbon nanotube, a carbon nanofiber, a carbon nanohorn, a carbon fibril, mesocarbon microbeads (MCMB), and a pitch-based carbon fiber.

Examples of the above silicon material include, in addition to silicon, silicon oxide and silicon alloy, silicon oxide composites expressed by SiC, $SiO_xC_y$ (in which $0<x\leq 3$, and $0<y\leq 5$), $Si_3N_4$, $Si_2N_2O$, and $SiO_x$ (in which $0<x\leq 2$) (for example, materials described in Japanese Patent Laid-Open Nos. 2004-185810 and 2005-259697), and a silicon material described in Japanese Patent Laid-Open No. 2004-185810. In addition, silicon materials described in Japanese Patent Nos. 5390336 and 5903761 may also be used.

The above silicon oxide is preferably a silicon oxide expressed by a composition formula $SiO_x$ (in which $0<x<2$, preferably $0.1\leq x\leq 1$).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the negative electrode active material, a negative electrode active material other than the silicon material may be used together. Examples of such a negative electrode active material include the above carbon material; a conductive polymer such as polyacene; a composite metal oxide expressed by $A_X B_Y O_Z$ (in which A represents an alkali metal or a transition metal, B represents at least one selected from transition metals such as cobalt, nickel, aluminum, tin, and manganese, O represents an oxygen atom, and X, Y, and Z are respectively numbers in the following ranges: $0.05 < X < 1.10$, $0.85 < Y < 4.00$ and $1.5 < Z < 5.00$), or other metal oxide. When the silicon material is used as the negative electrode active material, it is preferable to use a carbon material together because a volume change associated with the occlusion and release of lithium is small.

Examples of the above lithium atom-containing oxide include a ternary nickel cobalt lithium manganate, and a lithium-transition metal composite oxide, such as a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphate compound (such as $LiFePO_4$), a lithium-transition metal sulfate compound (such as $Li_xFe_2(SO_4)_3$), and a lithium-titanium composite oxide (such as lithium titanate: $Li_4Ti_5O_{12}$), and other conventionally known negative electrode active materials.

From the viewpoint of remarkably exhibiting the effect of the disclosure, the carbon material and/or the material alloyable with lithium is preferably contained in the negative electrode active material in an amount of 50% by mass or more, more preferably 80% by mass or more, further preferably 90% by mass or more, and particularly preferably 100% by mass.

In one embodiment, a negative electrode active material is preferable in which the negative electrode active material (C) contains 10% by mass or more (for example, 2% by mass or more, 5% by mass or more, 10% by mass or more, 25% by mass or more, 50% by mass or more, 75% by mass or more, 90% by mass or more, or 100% by mass) of silicon and/or a silicon oxide covered with a carbon layer.

The shape of the negative electrode active material is not particularly limited and may be an arbitrary shape such as a fine particle shape or a thin film shape, and a fine particle shape is preferable. An average particle diameter of the negative electrode active material is not particularly limited, and its upper limit and lower limit are, for example, 50 μm, 45 μm, 40 μm, 35 μm, 30 μm, 25 μm, 20 μm, 15 μm, 10 μm, 5 μm, 4 μm, 3 μm, 2.9 μm, 2 μm, 1 μm, 0.5 μm, and 0.1 μm. In one embodiment, from the viewpoint of forming a uniform and thin coating film, more specifically, for the reason that handleability is good if the average particle diameter is 0.1 μm or more and application of an electrode is easy if the average particle diameter is 50 μm or less, the average particle diameter of the negative electrode active material is preferably 0.1 μm to 50 μm, more preferably 0.1 μm to 45 μm, further preferably 1 μm to 10 μm, and particularly preferably 5 μm.

The upper limit and lower limit of the content of the component (A) with respect to 100% by mass of the negative electrode active material (C) in the above slurry are, for example, 15% by mass, 14% by mass, 13% by mass, 12% by mass, 11% by mass, 10% by mass, 9% by mass, 8% by mass, 7% by mass, 6% by mass, 5% by mass, 4% by mass, 3% by mass, 2% by mass, 1.5% by mass, 1% by mass, and 0.5% by mass. In one embodiment, the above content is preferably 0.5% by mass to 15% by mass.

<Conductive Carbon Aid (D) Having Zeta Potential of 0 mV or Higher at pH 5 to 7: Also Referred to as Component (D)>

The conductive carbon aid (D) having a zeta potential of 0 mV or higher at pH 5 to 7 may be used singly or in combination of two or more.

Examples of a conductive carbon aid having a zeta potential of 0 mV or higher at pH 5 to 7 include fibrous carbon, graphite particles, and carbon black.

Examples of the fibrous carbon include vapor grown carbon fiber (VGCF), a carbon nanotube (CNT), and carbon nanofiber (CNF).

Examples of the carbon black include acetylene black, Ketjen black, and furnace black.

In one embodiment, carbon black is preferable as the conductive carbon aid having a zeta potential of 0 mV or higher at pH 5 to 7.

The component (D) may be a conductive carbon aid having a zeta potential of 0 mV or higher at pH 5 to 7. The shape of the component (D) is not particularly limited. The dispersibility of the conductive carbon aid can be determined by the magnitude of the absolute value of the zeta potential. The zeta potential is an indicator of degree of the surface charge amount of particles. The larger the absolute value of the zeta potential of particles A, the larger the repulsive force between the particles A and the easier it is for the particles A to disperse. In contrast, the smaller the absolute value of the zeta potential of the particles A, the easier it is for the particles A to aggregate. A conductive carbon aid having a zeta potential of 0 mV or higher, particularly 0 mV to 30 mV, at pH 5 to 7, has low initial dispersibility and dispersion stability. However, a negative electrode slurry for a lithium ion battery containing the components (A) and (B) as well as the conductive carbon aid having a zeta potential of 0 mV or higher at pH 5 to 7 exhibits high initial dispersibility and dispersion stability.

The zeta potential of the conductive carbon aid at pH 5 to 7 can be measured at 25° C. (for example, at pH 6.1) using a zeta potential and particle size measurement system (product name "ELSZ-1000Z" made by Otsuka Electronics Co., Ltd.). A solution containing the conductive carbon aid can be prepared by using water as a solvent, putting the conductive carbon aid therein and stirring the mixture. In addition, the pH of this solution can be adjusted by putting hydrochloric acid or sodium hydroxide therein.

The upper limit and lower limit of the content of the component (D) with respect to 100% by mass of the above slurry are, for example, 6% by mass, 5% by mass, 4% by mass, 3% by mass, 2% by mass, 1.9% by mass, 1.7% by mass, 1.5% by mass, 1.3% by mass, 1.1% by mass, 1% by mass, 0.9% by mass, 0.7% by mass, 0.5% by mass, 0.3% by mass, 0.1% by mass, 0.09% by mass, 0.07% by mass, 0.05% by mass, 0.03% by mass, 0.01% by mass, 0.009% by mass, 0.007% by mass, 0.005% by mass, 0.003% by mass, 0.001% by mass, 0.0009% by mass, 0.0007% by mass, 0.0005% by mass, 0.0003% by mass, and 0.0001% by mass. In one embodiment, the above content is preferably 0.0001% by mass to 6% by mass.

<Conductive Aid Other than Component (D)>

In one embodiment, a conductive aid other than component (D) may be contained in the above slurry.

Examples of the conductive aid other than the component (D) include carbon black having a zeta potential of less than 0 mV at pH 5 to 7, and fine powder made of Cu, Ni, Al, Si or an alloy thereof having an average particle size of 10 μm or less. The content of the conductive aid other than the component (D) is not particularly limited, and is preferably 0% by mass to 10 parts by mass, more preferably 0.001 parts by mass to 6 parts by mass, with respect to 100 parts by mass the negative electrode active material.

<Slurry Viscosity Adjustment Solvent>

A slurry viscosity adjustment solvent is not particularly limited, and may include a non-aqueous medium having a normal boiling point of 80° C. to 350° C. The slurry viscosity adjustment solvent may be used singly or in combination of two or more. Examples of the slurry viscosity adjustment solvent include: an amide solvent, such as N-methylpyrrolidone, dimethylformamide, and N,N-dimethylacetamide; a hydrocarbon solvent, such as toluene, xylene, n-dodecane, and tetralin; an alcohol solvent, such as methanol, ethanol, 2-propanol, isopropyl alcohol, 2-ethyl-1-hexanol, 1-nonanol, and lauryl alcohol; a ketone solvent, such as acetone, methyl ethyl ketone, cyclohexanone, phorone, acetophenone, and isophorone; an ether solvent, such as dioxane and tetrahydrofuran (THF); an ester solvent, such as benzyl acetate, isopentyl butyrate, methyl lactate, ethyl lactate, and butyl lactate; an amine solvent, such as o-toluidine, m-toluidine, and p-toluidine; a lactone, such as γ-butyrolactone and δ-butyrolactone; a sulfoxide and sulfone solvent, such as dimethyl sulfoxide and sulfolane; and water. Among them, N-methylpyrrolidone is preferable from the viewpoint of application workability. The content of the above non-aqueous medium is not particularly limited, and is preferably 0% by mass to 10% by mass with respect to 100% by mass of the above slurry.

The above slurry may contain, as an additive, a component that does not correspond to any of the component (A), the component (B), the component (C), the component (D), water, the conductive aid other than the component (D), and the slurry viscosity adjustment solvent, without impairing the effect of the disclosure. Examples of the additive include those described above.

The content of the additive is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, or 0% by mass, with respect to 100% by mass of any one of the components (A) to (D).

Moreover, the dispersion (emulsion) may be contained in a larger amount than the above additive content. The upper limit and lower limit of the content of the dispersion (emulsion) with respect to 100% by mass of the negative electrode slurry for a lithium ion battery are, for example, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, from the viewpoints of electrode flexibility and discharge capacity retention rate, the amount of the dispersion (emulsion) added with respect to 100% by mass of the above aqueous solution or the above negative electrode slurry for a lithium ion battery is preferably less than 5% by mass.

The upper limit and lower limit of the pH of the above slurry are, for example, 9, 8.9, 8.5, 8, 7.9, 7.7, 7.5, 7.3, 7.1, 7, 6.9, 6.7, 6.5, 6.3, 6, 5.9, 5.6, 5.5, 5.4, 5.2, 5.1, and 5.

The above slurry is prepared by mixing the component (A), the component (B), the component (C), the component (D), water, and if necessary, the conductive aid other than the component (D), the slurry viscosity adjustment solvent and the additive.

Examples of a means of mixing the slurry include a ball mill, a sand mill, a pigment disperser, a Raikai mixer, an ultrasonic disperser, a homogenizer, a planetary mixer, and a Hobart mixer.

[Negative Electrode for Lithium Ion Battery]

The disclosure provides a negative electrode for a lithium ion battery, obtained by applying the above negative electrode slurry for a lithium ion battery to a current collector, and drying and curing the same. The above negative electrode for a lithium ion battery has a cured product of the above negative electrode slurry for a lithium ion battery on a surface of the current collector.

As the current collector, various known ones may be used without particular limitation. A material of the current collector is not particularly limited, and examples thereof include a metal material, such as copper, iron, aluminum, nickel, stainless steel, and nickel-plated steel, or a carbon material, such as carbon cloth and carbon paper. The form of the current collector is also not particularly limited. In the case of metal material, examples thereof include a metal foil, a metal cylinder, a metal coil, and a metal plate; in the case of carbon material, examples thereof include a carbon plate, a carbon thin film, and a carbon cylinder. Among them, when a negative electrode active material is used in the negative electrode, copper foil is preferably used as the current collector due to its current use in industrialized products.

The application means is not particularly limited, and examples thereof include a conventionally known coating device, such as a comma coater, a gravure coater, a micro gravure coater, a die coater, and a bar coater.

The drying means is also not particularly limited, and the temperature is preferably 60° C. to 200° C., more preferably 60° C. to 180° C. The atmosphere may be dry air or an inert atmosphere.

The thickness of the negative electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

[Lithium Ion Battery]

The disclosure provides a lithium ion battery including the above negative electrode for a lithium ion battery. The above battery also includes an electrolyte solution and a packaging material that are not particularly limited.

Examples of the electrolyte solution include non-aqueous electrolytic solution in which a supporting electrolyte is dissolved in a non-aqueous solvent. In addition, a film forming agent may be contained in the above non-aqueous electrolytic solution.

As the non-aqueous solvent, various known ones may be used without particular limitation, and may be used singly or in combination of two or more. Examples of the non-aqueous solvent include: a chain carbonate solvent, such as diethyl carbonate, dimethyl carbonate, and ethyl methyl carbonate; a cyclic carbonate solvent, such as ethylene carbonate, propylene carbonate, and butylene carbonate; a chain ether solvent, such as 1,2-dimethoxyethane; a cyclic ether solvent, such as tetrahydrofuran, 2-methyltetrahydrofuran, sulfolane, and 1,3-dioxolane; a chain ester solvent, such as methyl formate, methyl acetate, and methyl propionate; a cyclic ester solvent, such as γ-butyrolactone and γ-valerolactone; and acetonitrile. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more. Examples of the supporting electrolyte include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium ion conductivity. Therefore, the lithium ion conductivity can be adjusted according to the type of the supporting electrolyte.

As the film forming agent, various known ones may be used without particular limitation, and may be used singly or in combination of two or more. Examples of the film forming agent include: a carbonate compound, such as vinylene carbonate, vinyl ethylene carbonate, vinyl ethyl carbonate, methylphenyl carbonate, fluoroethylene carbonate, and difluoroethylene carbonate; an alkene sulfide, such as ethylene sulfide and propylene sulfide; a sultone compound, such as 1,3-propane sultone and 1,4-butane sultone; and an acid anhydride, such as maleic anhydride and succinic anhydride. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The form of the above lithium ion battery is not particularly limited. Examples of the form of the lithium ion battery include a cylinder type in which a sheet electrode and a separator are formed in a spiral shape, a cylinder type having an inside-out structure in which a pellet electrode and a separator are combined, and a coin type in which a pellet electrode and a separator are laminated. In addition, by accommodating the battery of these forms in an arbitrary exterior case, the battery can be used in an arbitrary shape such as a coin shape, a cylindrical shape, and a square shape.

A method for producing the above lithium ion battery is not particularly limited, and the lithium ion battery may be assembled by an appropriate procedure depending on the structure of the battery. Examples of the method for producing a lithium ion battery include a method described in Japanese Patent Laid-Open No. 2013-089437. The battery can be produced in the following manner. A negative electrode is placed on an exterior case, an electrolytic solution and a separator are provided thereon, a positive electrode is further placed so as to face the negative electrode, and the positive electrode is fixed with a gasket and a sealing plate.

EXAMPLES

Hereinafter, the disclosure will be specifically described through examples and comparative examples. However, the above description of the preferred embodiments and the following examples are provided for illustration only and not for limiting the disclosure. Therefore, the scope of the disclosure is not limited to the embodiments or examples specifically described herein, but only by the claims. In addition, in each of the examples and comparative examples, unless otherwise specified, numerical values such as part and % are based on mass.

Example 1-1

<Preparation of Water-Soluble Polymer (A)>

In a reactor equipped with a stirrer, a thermometer, a reflux condenser and a nitrogen gas introduction pipe, 1,228 g of ion-exchanged water, 189.8 g (2.10 mol) of 80% acrylic acid, and 0.33 g (0.0021 mol) of sodium methallyl sulfonate were put, and after oxygen in the reaction system was removed through nitrogen gas, the resultant was heated to 50° C. 1.4 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 140.3 g (1.68 mol) of 48% sodium hydroxide aqueous solution as a neutralizer was added and stirred, and an aqueous solution containing the water-soluble polymer (A) and having a neutralization ratio of 80% was obtained.

<Preparation of Hydrolyzed Partial Condensate (B) of Amino Group-Containing Trialkoxysilane>

In a reactor equipped with a stirrer, a thermometer, a reflux condenser and a nitrogen gas introduction pipe, 100 g of ion-exchanged water, 100 g of methanol, 1.23 g of nitric acid, and 200 g of 3-aminopropyltrimethoxysilane (product name "KBM-903" made by Shin-Etsu Chemical Co., Ltd.) were put and reacted at 25° C. for 0.5 hour, and a uniform aqueous solution containing the hydrolyzed partial condensate (B) of the amino group-containing trialkoxysilane having a degree of condensation of 1.4 and a weight average molecular weight of 160 was obtained.

<Preparation of Binder Aqueous Solution for Lithium-Ion Battery>

In a reactor equipped with a stirrer, a thermometer, a reflux condenser and a nitrogen gas introduction pipe, with respect to 90 parts by mass of the water-soluble polymer (A), 10 parts by mass of the hydrolyzed partial condensate (B) of the amino group-containing trialkoxysilane were added and stirred for 30 minutes, and a binder aqueous solution for a lithium ion battery was obtained. The B-type viscosity of this aqueous solution at 25° C. was 12,810 mPa·s and the pH was 7.1.

In the Example 1 series except for Example 1-1, a binder aqueous solution for a lithium ion battery containing the water-soluble polymer (A) and the hydrolyzed partial condensate (B) of the amino group-containing trialkoxysilane was obtained in the same manner as in Example 1-1 except that the monomer composition, the amount of the neutralizer, and the amount of the hydrolyzed partial condensate (B) of the amino group-containing trialkoxysilane in Example 1-1 were changed to those shown in Table 1.

Comparative Example 1-1

In a reactor equipped with a stirrer, a thermometer, a reflux condenser and a nitrogen gas introduction pipe, 1,228 g of ion-exchanged water, 189.8 g (2.10 mol) of 80% acrylic acid, and 0.33 g (0.0021 mol) of sodium methallyl sulfonate were put, and after oxygen in the reaction system was removed through nitrogen gas, the resultant was heated to 50° C. 1.4 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 140.3 g (1.68 mol) of 48% sodium hydroxide aqueous solution as a neutralizer was added and stirred, and an aqueous solution containing a water-soluble polymer was obtained. The B-type viscosity of this aqueous solution at 25° C. was 12,520 mPa·s and the pH was 6.1.

In the Comparative Example 1 series except for Comparative Example 1-1, the binder aqueous solution for a lithium ion battery was obtained in the same manner as in Example 1-1 except that the monomer composition, the amount of the neutralizer, and the amount of the hydrolyzed partial condensate (B) of the amino group-containing trialkoxysilane were changed to those shown in Table 1.

B-Type Viscosity

The viscosity of each binder aqueous solution was measured at 25° C. under the following conditions using a B-type viscometer (product name "B-type Viscometer TVB-10M" made by Toki Sangyo Co., Ltd.).

When the viscosity was 1,000 mPa·s to less than 10,000 mPa·s: No. 3 rotor was used at a rotational speed of 12 rpm.

When the viscosity was 10,000 mPa·s or more: No. 3 rotor was used at a rotational speed of 6 rpm.

TABLE 1

| | Water-soluble polymer (A) [mol %] | | | | Neutralization ratio [%] | Water-soluble polymer (A) (part by mass) | Hydrolyzed partial condensate (B) of amino group-containing trialkoxysilane (part by mass) | Molar amount of amino group of component (B)/molar amount of carboxyl group of component (A) | Glass transition temperature (° C.) | Weight average molecular weight | pH | B-type viscosity (mPa · s) |
|---|---|---|---|---|---|---|---|---|---|---|---|---|
| | Unsaturated carboxylic acid | Hydroxyalkyl (meth)acrylate | Other monomers | | | | | | | | | |
| | AA | HEA | SMAS | AM | | | | | | | | |
| Example 1-1 | 99.9 | — | 0.1 | — | 80 | 90.0 | 10.0 | 0.4 | 106 | 640,000 | 7.1 | 12,810 |
| Example 1-2 | 15.0 | 15.0 | 0.2 | 69.8 | 80 | 99.5 | 0.5 | 0.1 | 100 | 310,000 | 5.0 | 1,850 |
| Example 1-3 | 15.0 | 15.0 | 0.2 | 69.8 | 80 | 97.0 | 3.0 | 0.5 | 100 | 310,000 | 7.0 | 1,850 |
| Example 1-4 | 36.6 | 28.5 | 0.3 | 34.6 | 90 | 97.0 | 3.0 | 0.5 | 59 | 390,000 | 6.7 | 1,580 |
| Example 1-5 | 36.6 | 28.5 | 0.3 | 34.6 | 80 | 95.0 | 5.0 | 0.4 | 59 | 390,000 | 6.3 | 1,580 |
| Example 1-6 | 39.9 | 56.0 | 0.3 | 3.8 | 90 | 98.0 | 2.0 | 0.4 | 16 | 520,000 | 6.5 | 1,240 |
| Comparative Example 1-1 | 99.9 | — | 0.1 | — | 80 | 100.0 | 0.0 | 0.0 | 106 | 660,000 | 6.1 | 12,520 |
| Comparative Example 1-2 | 10.0 | 15.0 | 0.15 | 74.85 | 80 | 99.0 | 1.0 | 0.3 | 101 | 500,000 | 5.8 | 2,200 |
| Comparative Example 1-3 | 15.0 | 15.0 | 0.2 | 69.8 | 80 | 100.0 | 0.0 | 0.0 | 100 | 310,000 | 5.3 | 1,850 |
| Comparative Example 1-4 | 36.6 | 28.5 | 0.3 | 34.6 | 80 | 100.0 | 0.0 | 0.0 | 59 | 390,000 | 5.5 | 1,580 |
| Comparative Example 1-5 | 39.9 | 56.0 | 0.3 | 3.8 | 90 | 100.0 | 0.0 | 0.0 | 16 | 520,000 | 6.5 | 1,240 |
| Comparative Example 1-6 | 0.0 | 0.0 | 0.05 | 99.95 | — | 95.0 | 5.0 | — | 165 | 560,000 | 8.8 | 18,000 |
| Comparative Example 1-7 | 20.0 | 0.0 | 0.1 | 79.9 | 80 | 95.0 | 5.0 | 0.6 | 152 | 560,000 | 8.8 | 4,180 |
| Comparative Example 1-8 | 36.8 | 28.5 | 0.1 | 34.6 | 90 | 100.0 | 0.0 | 0.0 | 59 | 700,000 | 5.7 | 4,410 |
| Comparative Example 1-9 | 99.9 | — | 0.1 | — | 20 | 99.5 | 0.5 | 0.003 | 106 | 650,000 | 4.1 | 2,650 |

* Neutralization ratio is a value with respect to the carboxyl group contained in the component (A).
AA: Acrylic acid ("80% Acrylic Acid" made by Osaka Organic Chemical Industry Ltd.)
HEA: 2-hydroxyethyl acrylate ("HEA" made by Osaka Organic Chemical Industry Ltd.)
SMAS: Sodium methallyl sulfonate
AM: Acrylamide ("50% Acrylamide" made by Mitsubishi Chemical Corporation)
NaOH: Sodium hydroxide ("48% Sodium Hydroxide Solution" made by Kanto Chemical Co., Inc.)

Glass Transition Temperature

It is a value calculated based on the Fox equation.

Weight Average Molecular Weight

The weight average molecular weight was calculated as a value in terms of polyacrylic acid as measured by gel permeation chromatography (GPC) under a 0.2 M phosphate buffer/acetonitrile solution (90/10, pH 8.0). HLC-8220 (made by Tosoh Corporation) was used as a GPC device, and SB-806M-HQ (made by SHODEX) was used as a column.

pH

The pH of each binder aqueous solution was measured at 25° C. using a glass electrode pH meter (product name "Handy pH Meter D-52" made by Horiba, Ltd.).

Preparation of Conductive Carbon Aid Paste

Example 2-1

By use of a commercially available rotation/revolution mixer ("Awatori Rentaro" made by THINKY CORPORATION), 40 parts by mass in terms of solid content of the binder aqueous solution for a lithium ion battery containing the water-soluble polymer (A) and the hydrolyzed partial condensate (B) of the amino group-containing trialkoxysilane, which was obtained in Example 1-1, and 60 parts by mass of carbon black ("Super C65" made by Imerys Graphite & Carbon Japan K.K.) having a zeta potential of 16 mV at pH 6.1 were put in a container dedicated to the mixer. Ion-exchanged water was added thereto so as to achieve a solid content concentration of 13.5%, and the container was set in the above rotation/revolution mixer. Next, the resultant was kneaded at 2,000 rpm for 10 minutes, and a conductive carbon aid paste was obtained.

The above zeta potential was measured at 25° C. and pH 6.1 using a zeta potential and particle size measurement system (product name "ELSZ-1000Z" made by Otsuka Electronics Co., Ltd.).

In the Example 2 series except for Example 2-1 and the Comparative Example 2 series, a conductive carbon aid paste was prepared in the same manner as in Example 2-1, except that the composition in Example 2-1 was changed to those shown in the following table.

<Initial Dispersion Test for Conductive Carbon Aid Paste>

Median diameters "D50" and "D90" of the conductive carbon aid paste obtained in Example 2-1 were measured using a commercially available laser diffraction/scattering particle size distribution measurement device (product name "LA-960" made by HORIBA). The higher the measured values of "D50" and "D90", the worse the initial dispersibility of the conductive carbon aid and the more aggregated the conductive carbon aid becomes. The lower the measured values of "D50" and "D90", the better the initial dispersibility of the conductive carbon aid.

The numerical value of the median diameter "D50" was evaluated according to the following evaluation criteria.

A: 3.5 μm or less
B: More than 3.5 μm

The numerical value of "D90" was evaluated according to the following evaluation criteria.

A: 7.0 μm or less
B: More than 7.0 μm

<Dispersion Stability Test for Conductive Carbon Aid Paste>

The conductive carbon aid paste obtained in Example 2-1 was left to stand at room temperature for 24 hours, followed by measurement of the median diameters "D50" and "D90". The larger the change in the measured values of "D50" and "D90", the worse the dispersion stability of the conductive carbon aid and the more aggregated the conductive carbon aid becomes. The smaller the change in the measured values of "D50" and "D90", the better the dispersion stability of the conductive carbon aid. Rates of change of "D50" and "D90" were calculated by the following equations and evaluated according to the following evaluation criteria.

Rate of change (%) of "$D50$"=[{($D50$ of conductive carbon aid paste after 24 hours)−($D50$ of conductive carbon aid paste after initial dispersion test)}/($D50$ of conductive carbon aid paste after initial dispersion test)]×100

Rate of change (%) of "$D90$"=[{($D90$ of conductive carbon aid paste after 24 hours)−($D90$ of conductive carbon aid paste after initial dispersion test)}/($D90$ of conductive carbon aid paste after initial dispersion test)]×100

A: Less than +40%
B: +40% or more

TABLE 2

| | | Dispersion evaluation of conductive carbon aid paste | | | | | | | |
|---|---|---|---|---|---|---|---|---|---|
| | | Initial dispersibility of conductive carbon aid paste | | | | Dispersion stability of conductive carbon aid paste | | | |
| | | | | | | Rate of change of D50 (%) | Evaluation | Rate of change of D90 (%) | Evaluation |
| | Binder aqueous solution | D50 (μm) | Evaluation | D90 (μm) | Evaluation | | | | |
| Example 2-1 | Example 1-1 | 2.7 | A | 5.7 | A | 14 | A | 19 | A |
| Example 2-2 | Example 1-2 | 3.3 | A | 6.7 | A | 16 | A | −8 | A |
| Example 2-3 | Example 1-3 | 3.5 | A | 6.9 | A | 6 | A | −6 | A |
| Example 2-4 | Example 1-4 | 3.2 | A | 6.6 | A | 29 | A | 24 | A |
| Example 2-5 | Example 1-5 | 3.1 | A | 6.2 | A | 37 | A | 31 | A |
| Example 2-6 | Example 1-6 | 2.5 | A | 4.9 | A | 39 | A | 37 | A |
| Comparative Example 2-1 | Comparative Example 1-1 | 3.2 | A | 8.5 | B | −6 | A | −17 | A |
| Comparative Example 2-2 | Comparative Example 1-2 | 4.7 | B | 8.7 | B | 27 | A | 36 | A |
| Comparative Example 2-3 | Comparative Example 1-3 | 3.8 | B | 7.3 | B | 43 | B | 44 | B |
| Comparative Example 2-4 | Comparative Example 1-4 | 3.3 | A | 6.8 | A | 51 | B | 31 | A |
| Comparative Example 2-5 | Comparative Example 1-5 | 2.7 | A | 4.8 | A | 33 | A | 69 | B |
| Comparative Example 2-6 | Comparative Example 1-6 | 4.8 | B | 11.9 | B | 20 | A | 8 | A |
| Comparative Example 2-7 | Comparative Example 1-7 | 3.1 | A | 10.2 | B | −11 | A | −24 | A |
| Comparative Example 2-8 | Comparative Example 1-8 | 5.0 | B | 19.0 | B | 5 | A | 177 | B |
| Comparative Example 2-9 | Comparative Example 1-9 | 38.9 | B | 192.4 | B | 53 | B | 20 | A |

Preparation of Negative Electrode Slurry, and Cell Production and Evaluation
<Preparation of Negative Electrode Slurry>

Example 3-1

A slurry was prepared using a commercially available homodisper ("Homodisper Model 2.5" made by PRIMIX Corporation). In a mayonnaise bottle as a container, 5.0 parts by mass in terms of solid content of the binder aqueous solution for a lithium ion battery containing the water-soluble polymer (A) and the hydrolyzed partial condensate (B) of the amino group-containing trialkoxysilane, which was obtained in Example 1-1, was mixed with 95 parts by mass of graphite having a D50 (median diameter) of 20 μm, 5 parts by mass of silicon monoxide particles ("CC Powder" made by OSAKA Titanium technologies Co., Ltd.) having a D50 (median diameter) of 5 μm, and 1 part by mass of a conductive carbon aid ("Super C65" made by Imerys Graphite & Carbon Japan K.K.). Ion-exchanged water was added thereto so as to achieve a solid content concentration of 47%, and the container was set in the above homodisper. Next, the resultant was kneaded at 2,000 rpm for 30 minutes. After that, the resultant was subjected to defoaming for 1 minute using a rotation/revolution mixer ("Awatori Rentaro" made by THINKY CORPORATION), and a slurry for a negative electrode was obtained.

In the Example 3 series except for Example 3-1 and the Comparative Example 3 series, a slurry was prepared in the same manner as in Example 3-1, except that the composition in Example 3-1 was changed to those shown in the following table.

<Storage Stability Test for Negative Electrode Slurry>

The storage stability of a slurry was visually evaluated according to the following criteria.
- A: The whole was in the form of a homogeneous paste, no liquid separation was present and no aggregates were observed.
- B: The whole was in the form of a substantially homogeneous paste, slight liquid separation was observed, but no aggregates were observed.
- C: A small number of aggregates and a large amount of liquid separation were observed at the bottom of the container.

<Production of Negative Electrode>

The above slurry for a lithium ion battery was uniformly applied to a surface of a current collector composed of copper foil by a doctor blade method so that a film thickness after drying would be 170 μm. The resultant was dried at 80° C. for 30 minutes and then subjected to a heating treatment at 150° C. in vacuum for 120 minutes. After that, by press processing with a roll press machine to achieve a film (negative electrode active material layer) density of 1.5 g/cm$^3$, a negative electrode was obtained.

<Production of Positive Electrode>

$LiNi_{0.5}Co_{0.2}Mn_{0.3}O_2$ as a positive electrode active material, acetylene black as a conductive auxiliary agent, and polyvinylidene fluoride (PVDF) as a binder are mixed by 88 parts by mass, 6 parts by mass, and 6 parts by mass, respectively, and a positive electrode slurry for a lithium ion battery was produced by dispersing the mixture in an appropriate amount of N-methyl-2-pyrrolidone (NMP).

The above positive electrode slurry for a lithium ion battery was uniformly applied to a surface of a current collector composed of aluminum foil by a doctor blade method so that a film thickness after drying would be 110 μm. The resultant was dried at 150° C. for 30 minutes and then subjected to a heating treatment at 150° C. in vacuum for 120 minutes. After that, by press processing with a roll press machine to achieve a film (positive electrode active material layer) density of 3.0 g/cm$^3$, a positive electrode was obtained.

<Evaluation of Electrode Flexibility>

The negative electrode was cut into a width of 10 mm and a length of 70 mm, and was wound around a Teflon™ rod having a diameter of 30 mmØ with an active material layer facing outward. A state of a surface of the active material layer was observed and evaluated according to the following criteria.
- A: No cracks and peeling occurred at all in the active material layer bound on the current collector.
- B: Cracks were seen in the active material layer bound on the current collector, but no peeling was observed.
- C: Cracks were seen and peeling was observed in the active material layer bound on the current collector.

An electrode with high electrode flexibility is less likely to cause problems such as curling, cracking, and lack of active materials in an electrode production process. On the other hand, an electrode with low electrode flexibility is highly likely to cause problems such as curling, cracking, and lack of active material in the electrode manufacturing process, and tends to be a cause of a lowered discharge capacity retention rate.

<Assembly of Lithium Half-Cell>

In an argon-purged glove box, the above negative electrode and positive electrode were punched and formed to have a diameter of 16 mm, and the resultant was placed inside a packing above an aluminum lower lid of a test cell (made by Nippon Tomcell Co., Ltd.). Next, a separator (product name "Selion P2010" made by CS Tech Co., Ltd.) composed of a polypropylene porous film punched out to a diameter of 24 mm was placed. Further, after 500 μL of electrolytic solution was poured in so that no air could enter, a commercially available metallic lithium foil punched and formed into a size of 16 mm was placed, and an exterior body of the test cell was fastened and sealed with screws. Thereby, a lithium half-cell was assembled. The electrolytic solution used here was a solution in which $LiPF_6$ was dissolved at a concentration of 1 mol/L in a solvent having a mass ratio of ethylene carbonate to ethyl methyl carbonate of 1/1.

<Charge and Discharge Measurement>

Charging and discharging were performed as follows. The lithium half-cell was put in a constant temperature bath set to 25° C., charging was started at a constant current (0.1 C), and the charging was completed (cutoff) when the voltage reached 0.01 V. Next, the discharging was started at a constant current (0.1 C) and was completed (cutoff) when the voltage reached 1.0 V. The above charging and discharging were repeated 30 times.

In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

<Discharge Capacity Retention Rate>

The discharge capacity retention rate was calculated from the following equation.

Discharge capacity retention rate={(discharge capacity at 30th cycle)/(discharge capacity at 1st cycle)}×100(%)

TABLE 3

| | Negative electrode active material (C) | | Carbon black (D) | Binder aqueous solution | | Storage stability of electrode slurry | Evaluation of electrode flexibility | Discharge capacity retention rate (%) |
|---|---|---|---|---|---|---|---|---|
| | Silicon monoxide | Graphite | | | | | | |
| | Part by mass | Part by mass | Part by mass | Name | Part by mass | | | |
| Example 3-1 | 5.0 | 95.0 | 1.0 | Example 1-1 | 5.0 | B | B | 85 |
| Example 3-2 | 5.0 | 95.0 | 1.0 | Example 1-2 | 5.0 | A | B | 88 |
| Example 3-3 | 5.0 | 95.0 | 1.0 | Example 1-3 | 5.0 | A | B | 86 |
| Example 3-4 | 5.0 | 95.0 | 1.0 | Example 1-4 | 5.0 | A | A | 90 |
| Example 3-5 | 20.0 | 80.0 | 1.0 | Example 1-5 | 5.0 | A | A | 75 |
| Example 3-6 | 5.0 | 95.0 | 1.0 | Example 1-6 | 5.0 | A | A | 89 |
| Comparative Example 3-1 | 5.0 | 95.0 | 1.0 | Comparative Example 1-1 | 5.0 | A | B | 78 |
| Comparative Example 3-2 | 5.0 | 95.0 | 1.0 | Comparative Example 1-2 | 5.0 | A | B | 80 |
| Comparative Example 3-3 | 5.0 | 95.0 | 1.0 | Comparative Example 1-3 | 5.0 | B | B | 83 |
| Comparative Example 3-4 | 5.0 | 95.0 | 1.0 | Comparative Example 1-4 | 5.0 | B | A | 85 |
| Comparative Example 3-5 | 5.0 | 95.0 | 1.0 | Comparative Example 1-5 | 5.0 | B | A | 85 |
| Comparative Example 3-6 | 50.0 | 50.0 | 1.0 | Comparative Example 1-6 | 7.0 | C | C | 63 |
| Comparative Example 3-7 | 10.0 | 90.0 | 1.0 | Comparative Example 1-7 | 2.5 | B | C | 79 |
| Comparative Example 3-8 | 5.0 | 95.0 | 1.0 | Comparative Example 1-8 | 5.0 | B | A | 81 |
| Comparative Example 3-9 | 5.0 | 95.0 | 2.0 | Comparative Example 1-9 | 5.0 | C | C | 73 |

What is claimed is:

1. A binder aqueous solution for a lithium ion battery, having a pH of 5 to 8 and containing:
   a water-soluble polymer (A), wherein the water-soluble polymer (A) is a polymer of a monomer group containing, with respect to 100 mol % of the monomer group, 15 mol % to 40 mol % of an unsaturated carboxylic acid or an inorganic salt thereof, 3 mol % to 40 mol % of a (meth)acrylamide group-containing compound, and has a glass transition temperature of 110° C. or lower; and
   a hydrolyzed partial condensate (B) of an amino group-containing trialkoxysilane, and a degree of condensation of the hydrolyzed partial condensate of the amino group-containing trialkoxysilane being 1.01 to 1,000, wherein the amino group-containing trialkoxysilane is selected from the group consisting of 3-aminopropyltrimethoxysilane, 3-aminopropyltriethoxysilane, N-2-(aminoethyl)3-aminopropyltrimethoxysilane, N-2-(aminoethyl)-3-aminopropyltriethoxysilane, and 3-triethoxysilyl-N-(1,3-dimethyl-butylidene)propylamine.

2. The binder aqueous solution for a lithium ion battery according to claim 1, wherein a molar ratio between amino group of the hydrolyzed partial condensate (B) of the amino group-containing trialkoxysilane to carboxyl group of the water-soluble polymer (A) is 0.05 or more.

3. The binder aqueous solution for a lithium ion battery according to claim 1, containing, with respect to 100 mol % of the monomer group, 15 mol % to 60 mol % of hydroxyalkyl(meth)acrylate having a hydroxyalkyl group having 2 to 4 carbon atoms.

4. A negative electrode slurry for a lithium ion battery, containing:
   a water-soluble polymer (A), wherein the water-soluble polymer (A) is a polymer of a monomer group containing, with respect to 100 mol % of the monomer group, 15 mol % to 40 mol % of an unsaturated carboxylic acid or an inorganic salt, 3 mol % to 40 mol % of a (meth)acrylamide group-containing compound, and has a glass transition temperature of 110° C. or lower;
   a hydrolyzed partial condensate (B) of an amino group-containing trialkoxysilane;
   a negative electrode active material (C); and
   a conductive carbon aid (D), having a zeta potential of 0 mV or higher at pH 5 to 7, wherein a degree of condensation of the hydrolyzed partial condensate of the amino group-containing trialkoxysilane is 1.01 to 1,000,
   wherein the amino group-containing trialkoxysilane is selected from the group consisting of 3-aminopropyltrimethoxysilane, 3-aminopropyltriethoxysilane, N-2-(aminoethyl)3-aminopropyltrimethoxysilane, N-2-(aminoethyl)-3-aminopropyltriethoxysilane, and 3-triethoxysilyl-N-(1,3-dimethyl-butylidene)propylamine and
   wherein the negative electrode slurry has a pH of 5 to 8.

5. A negative electrode for a lithium ion battery, obtained by applying the negative electrode slurry for a lithium ion battery according to claim 4 to a current collector, and drying and curing the same.

6. A lithium ion battery, comprising the negative electrode for a lithium ion battery according to claim 5.

* * * * *